United States Patent

Halberschmidt et al.

[15] 3,641,711

[45] Feb. 15, 1972

[54] APPARATUS FOR GRINDING GLASS

[72] Inventors: Friedrich Halberschmidt, Merkstein; Albrecht Overath, Wurselen, both of Germany

[73] Assignee: Compagnie de Saint-Gobain, Seine, France

[22] Filed: Oct. 8, 1969

[21] Appl. No.: 864,702

[30] Foreign Application Priority Data

Oct. 14, 1968 France.....................................169764

[52] U.S. Cl..............................................................51/100
[51] Int. Cl................................................................B24b 9/10
[58] Field of Search...........................................51/100, 235

[56] References Cited

UNITED STATES PATENTS

| 3,114,292 | 12/1963 | Harris | 51/100 X |
| 2,640,301 | 6/1953 | Hill | 51/100 |
| 2,691,937 | 10/1954 | Emerson | 51/235 X |

FOREIGN PATENTS OR APPLICATIONS 1,227,865   3/1960   France......................................51/100

*Primary Examiner*—Harold D. Whitehead
*Attorney*—Dale A. Bauer, John L. Seymour and Bauer and Seymour

[57] ABSTRACT

An apparatus for automatically grinding the edges of sheets of glass to a predetermined contour. A template of the desired shape and a plate of glass to be ground are mounted in fixed positions; a carriage movable with respect to the template and glass carries a template follower and an edge grinding mechanism. The grinding tool is adjustable on the carriage toward and away from the glass, so as to compensate for wearing of the tool. The tool mounting and driving means is rotatable about an eccentric axis to vary the position of the zone of the tool engaging the glass; rotation of such means is under the automatic control of the template follower as it turns about its axis in following the template.

10 Claims, 7 Drawing Figures

INVENTORS
FRIEDRICH HALBERSCHMIDT
ALBRECHT OVERATH

Bauer and Seymour
ATTORNEYS

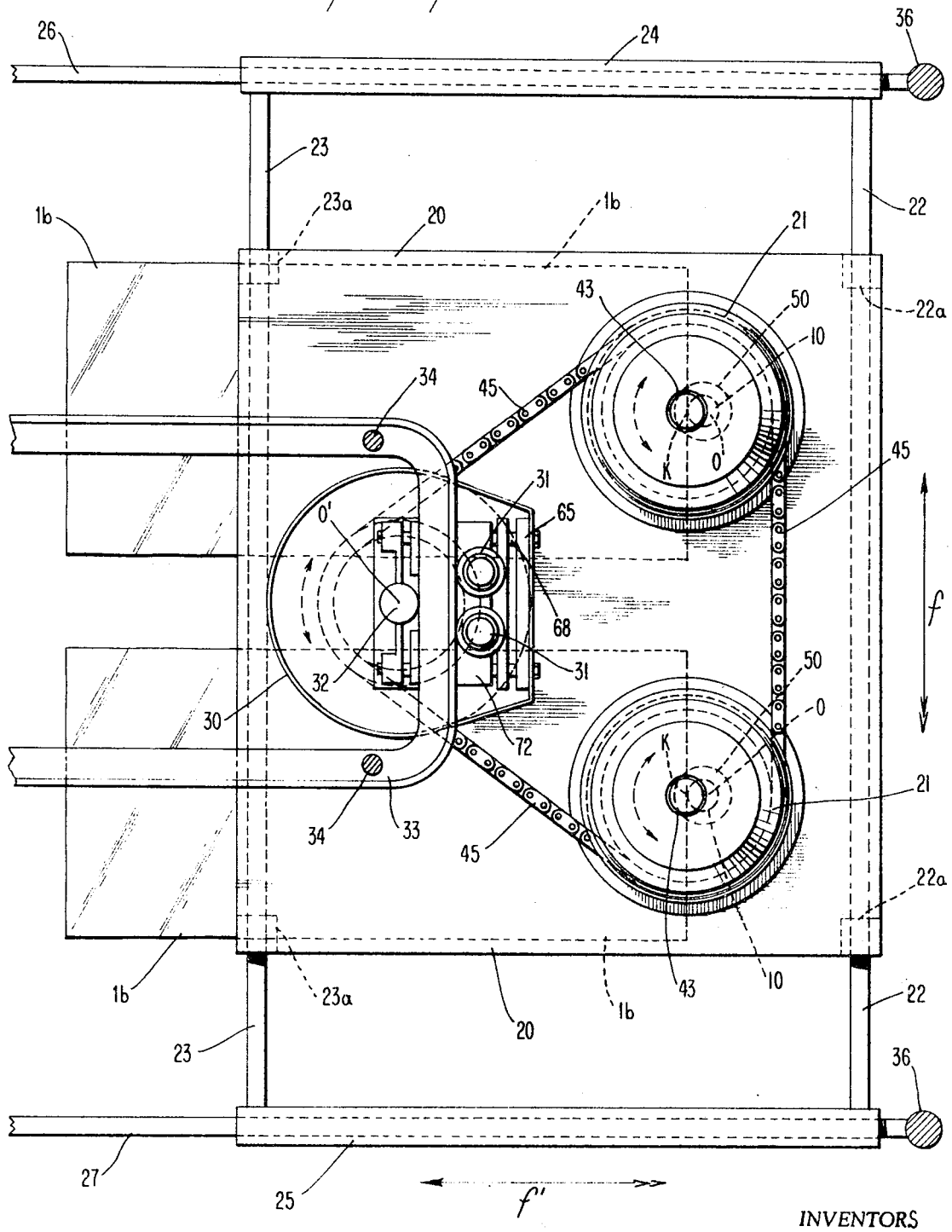

APPARATUS FOR GRINDING GLASS

This invention relates to a machine for automatically grinding the edge of sheets or plates of glass along a predetermined desired contour, wherein a tool support mounting the grinding mechanism is forced and guided along the contour of the glass while the glass is held fixed relative thereto.

A machine of this type has been described, for example, in French Pat. No. 1,227,965. In such prior machine, the tool support is suspended from a carriage to which it is affixed, the carriage being provided with guiding rollers which forcibly engage and roll along a template having a shape corresponding to that of the glass to be ground. In such apparatus the tool support and the carriage are disposed at the outer end of a double arm which is pivotally mounted at its other end. In such prior machine the grinding tool has a tendency to vibrate since the double arm is mounted in cantilever style. This adversely affects the accuracy of grinding, and may cause chipping of the glass at the end of the grinding operation upon a piece of glass. Moreover, the double arm is subjected to movement in the course of which, depending upon the instantaneous position of the double arm, the arm is moved momentarily at a speed which considerably exceeds the speed of travel of the grinding tool. This subjects the apparatus to very appreciable forces of acceleration and deceleration, and thus very adversely affects the permissible speed of operation of the apparatus. Further, with such prior apparatus it is not possible to grind more than one piece of glass by guiding the tool in the described manner. Finally, when the template is to be changed, the guiding mechanism must be completely disassembled; this requires an interruption of production and decreases the accuracy of the guiding mechanism.

Besides the above-described prior machine, there are other machines for edge-grinding glass. Among such other machines are those in which the glass to be ground is guided against grinding wheels rotating on fixed axes or mounted on depending arms. In such machines, the speed of movement of the grinding wheel along the glass is not constant; as a consequency the machines work at speeds and accuracies much below those theoretically possible. These machines are not at all satisfactory for commercial production.

The present invention is based on the principle of forced guidance of the grinding tool along a predetermined path; it improves such machines by increasing the rate at which they work, their accuracy, and thus widens the field of their use. Moreover, the apparatus of the invention makes it possible to change the template rapidly and by simple means. Also, the apparatus of the invention permits a plurality of grinding tools to be guided by a single template.

A primary distinguishing feature of the grinding machine of the present invention is the fact that the support on which the grinding tool is mounted for rectangular movement in one direction on a member which, in its turn, is movable upon slides disposed perpendicular to said one direction.

In accordance with a preferred embodiment of the grinding machine of the invention, the two slide systems form a system of rectangular coordinates which permit the grinding tool to move in the desired path. Beside supporting the tool, the member itself may be moved. Such member is light in weight so that masses that move remain relatively small and the necessary accelerations and decelerations may be produced exactly and without the appearance of vibrations or jolts. The absolute values of the speed of the elements along each of the two coordinate axes are at least substantially equal to the speed of movement of the grinding tool so that the forces of acceleration may be kept within optimum limits. The mounting of the tool support is simple and secure, and eliminates any undesirable play or vibration. The speed of grinding may, if necessary, be changed in a simple manner during the grinding operation.

In a first described embodiment the forced or powered guidance of the grinding tool is obtained by providing on the grinding machine a template corresponding to the contour of the glass, a feeler provided with guide rolls travelling along the template. The feeler is coupled to the grinding mechanism, and is movable simultaneously therewith along the rectangular member and the perpendicular guide rails; at least one of the guide rolls being driven by a motor disposed on the template following mechanism.

The template follower or feeler may be disposed beneath the grinding mechanism. It is, however, equally possible to locate the template follower and the grinding mechanism in side-by-side relationship. In the latter manner a plurality of grinding mechanisms may advantageously be controlled by a single template.

The template itself has as its only function the guiding of the grinding mechanism supported on the slides on the rectangular member and the slides perpendicular thereto. Contrary to the above described prior machines, the template in the machine of the present invention does not have to support the grinding mechanism, and so its construction is light and simple.

Because the grinding tool wears with use, it is necessary to correct the position of the tool from time to time. To accomplish this, in one advantageous embodiment of the invention, the grinding mechanism is mounted on the tool support in such manner that in the course of the grinding operation the tool rotates about a central vertical axis and is adjustable in a radial direction, perpendicular to the edge of the glass being ground.

Another advantage of the grinding machine of the invention resides in the fact that the grinding mechanism may be guided with equal precision without a template. To accomplish this, the tool support carrying the grinding mechanism and the rectangular member are provided with individual driving mechanisms, and that such driving mechanisms are controlled by a programmed memory device. This embodiment has the advantage that, when the shape of the pieces of glass to be ground changes, no manual changing of the template is necessary, and so the production time of the grinding operation is shortened. The program may be contained, for example, in punch cards or on a magnetic tape. The thus programmed grinding machine has the further advantage that, similar to cutting machines operating on the same principle, a single central program distributor is necessary; the same program can be used to control both cutting and grinding machines simultaneously.

In the forced guiding of the grinding tool, it is necessary that the sheet of glass, before the start of the grinding operation, shall be positioned very precisely so that the grinding tool will engage the glass correctly around its entire border. In accordance with another characteristic of the invention, there is provided for such purpose a particularly advantageous centering mechanism in which the centering of the glass is effected in a first station upon a turntable, so that the glass-centering operation does not increase the length of time required for the grinding operation. The pieces of glass, once they have been centered, are then transported in centered position to the grinding station proper; after grinding the pieces of glass are removed from the turntable at a third station.

Other particulars and features of the machine according to the invention will be set forth in the following description, in which reference is made to the accompanying drawings illustrating nonlimiting examples of the machine.

In the drawings:

FIG. 7 is a view in plan on a much larger scale of a part of the structure shown in FIG. 2.

Figure 1:
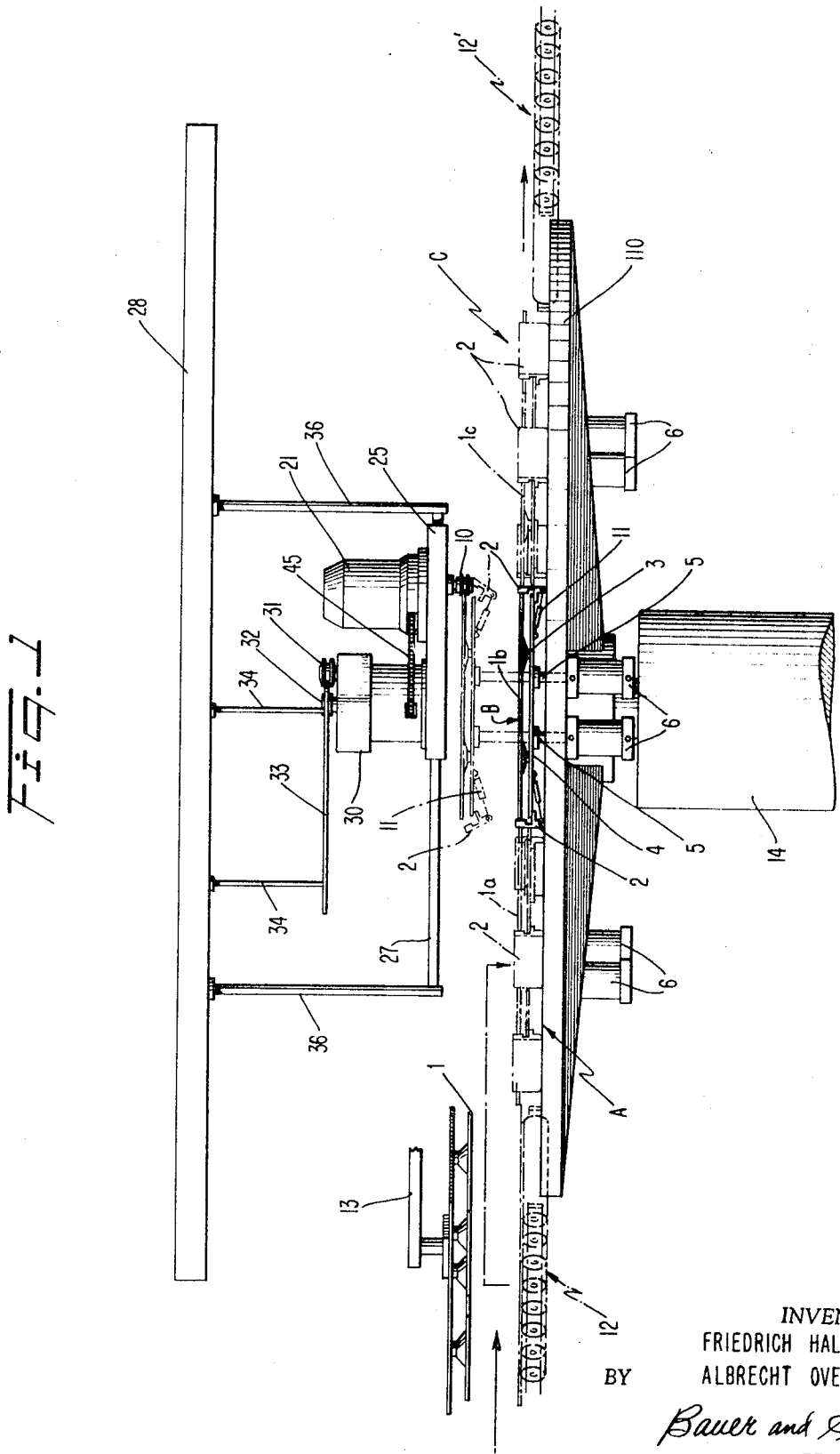
FIG. 1 is a view in vertical transverse section through an automatic grinding station in accordance with the invention, and the corresponding part of a turntable for carrying the pieces of glass to be and being ground, the mechanism which holds the glass sheet being shown in solid lines in its lowered, nongrinding position and in phantom lines in its raised, sheet grinding position.
Figure 2:
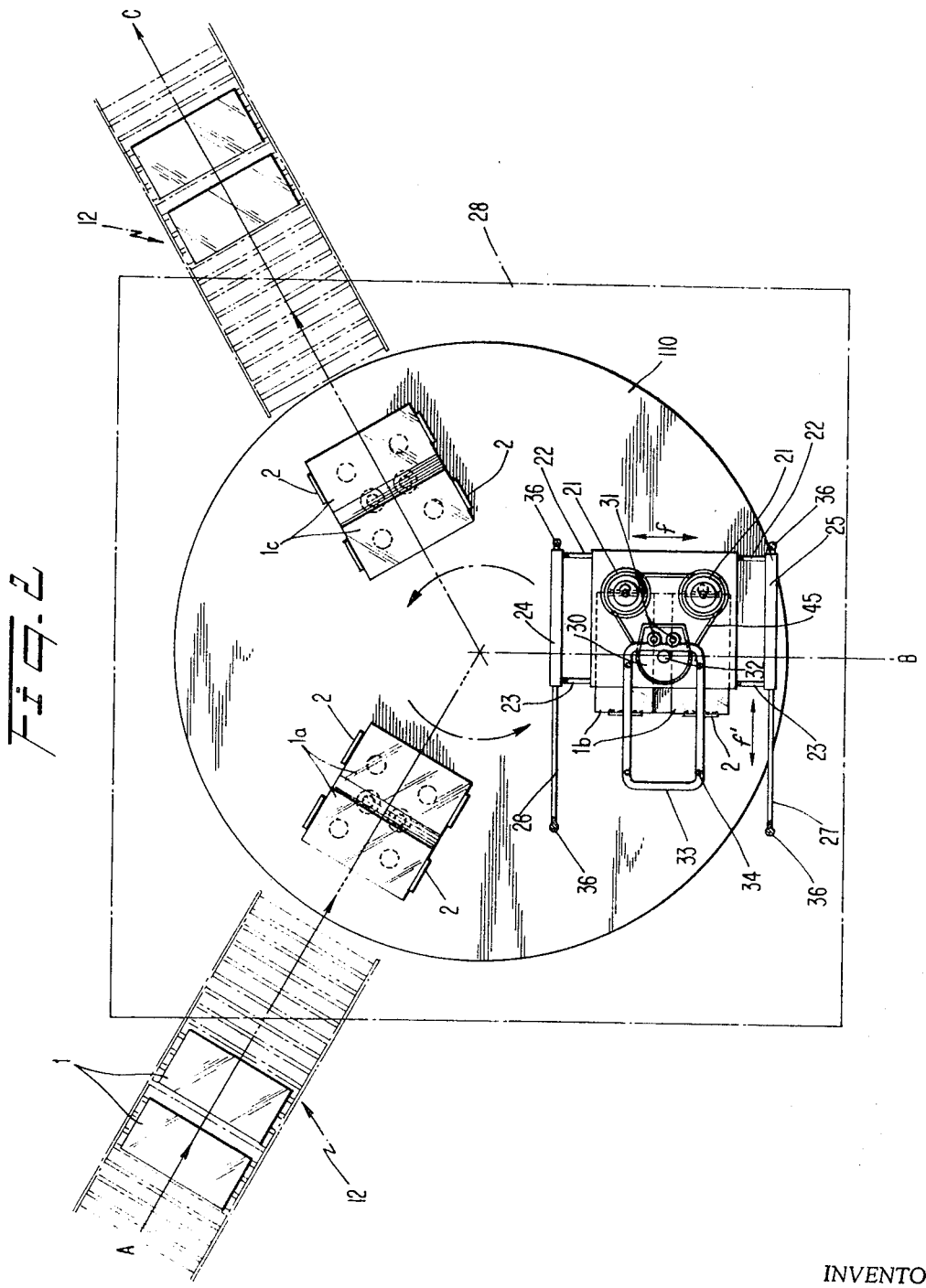
FIG. 2 is a view in plan of the grinding station shown in FIG. 1.

In the embodiment of the apparatus shown, there is a horizontal turntable 110 which is progressively indexed and then halted by a driving mechanism 14 (FIG. 1). The turntable has three equally angularly spaced glass plate or sheet holding stations thereon, the glass holding stations travelling from a stationary glass loading station A, to a stationary glass grinding station B, and, after the glass has been edge ground, to a discharge station C (FIG. 2). The apparatus is shown as holding two glass plates at each station on the turntable, the two as yet unground plates at station A on the turntable being designated 1a, those at the grinding station B being designated 1b, and those about to be discharged from station C being designated 1c.

As shown schematically in FIG. 1, one or more plates of glass, generally designated 1, are fed by a conveyor 12 to a sheet pick up mechanism mounted on a swinging arm 13. There the glass sheet is picked up by vacuum lifting means, swung to the right, and lowered onto turntable 110 at the station A. Each of the three glass holding stations on the turntable has a supporting plate 4 on which there are disposed a plurality of upwardly facing vacuum cups 3. The glass plate 1 is lowered onto the vacuum cups 3 between a plurality of angularly spaced pivotally mounted glass centering jaws 2 which are at that time held in upright position by respective air cylinders 11 acting between plate 4 and the lower ends of jaws 2. The vacuum cups 3 are then subjected to decreased pressure to clamp the glass plate to the plate 4. As will be evident upon consideration of the part of FIG. 1 at station B, plate 4 is affixed to the heads of piston rods 5 of cylinders 6. After the glass plate has been carried by the turntable 110 to station B, the support plate 4 is raised by cylinders 6; at the same time, the centering jaws 2 are swung outwardly by cylinders 11 to expose the entire edge of glass plate for grinding.

Figure 3:
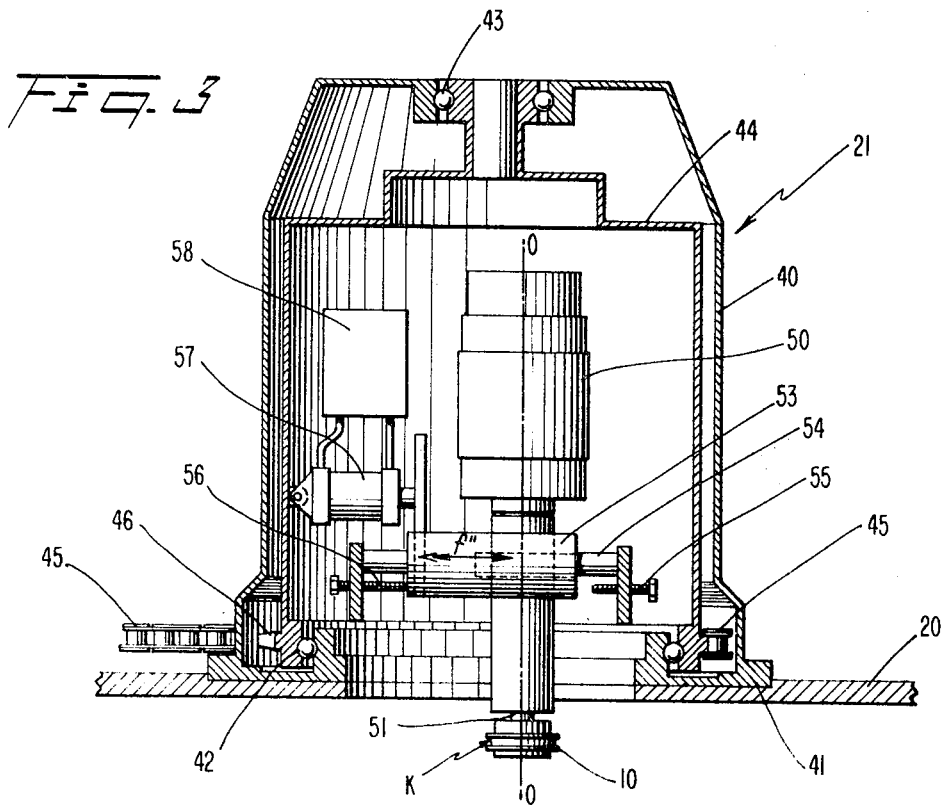
FIG. 3 is a view in vertical section through the tool support.

The edge grinding station B carries two identical grinding mechanisms 21, disposed in side-by-side relationship, acting upon the respective ones of two similarly placed glass plates 1, as particularly shown in FIGS. 3 and 7. A platform or platen 20 at station B has the two grinding mechanisms 21 affixed thereto, there also being a cam follower 30 affixed to platen 20. The cam follower is disposed laterally offset from and equidistant from the two grinding mechanisms. The cam follower mechanism includes two pressure rollers 31, driven by means not shown, and a guide roller 32, the rollers 31 and the roller 32 engaging and rolling along the opposite parallel sides of a rail 33 which constitutes the template. Rail 33, which has the same size and shape as the glass plates to be ground, is, in this instance, of closed rectangular shape, but having curved corners which rollers 31, 32 can traverse. Rail 33 is fixedly supported parallel to the glass sheets 1 by members shown schematically at 34, FIG. 1, depending from a fixed frame part 28.

The platen 20 is thus caused to follow a path in a horizontal plane which exactly conforms to the shape of the template rail 33. The platen 20 and the grinding mechanisms 21 and cam follower 30 are mounted for movement within limits in any direction in the plane of platen 20 by the following means. Referring to FIGS. 2 and 7, two spaced parallel transverse rods or rails 22, 23 disposed in a plane parallel to that of platen 20 are accurately slidingly received within guides 22a and 23a, respectively, on the corners of support 20. Rails 22, 23 permit the support 20 to move therealong in either direction, as indicated by the double-headed arrow $f$, FIG. 7. The outer ends of the rails 22, 23 are fixedly connected to longitudinally extending parallel tubes 24, 25 disposed at right angles to the rails 22, 23. Parallel rods or rails 26, 27 are fixedly mounted, as by being suspended from frame 28 by rods or braces as shown at 36 in FIG. 1. The composite member made up of the rails 22, 23 and the tubes 24, 25 is guided for movement along the direction of the double-headed arrow $f'$, FIG. 7.

Figure 4:
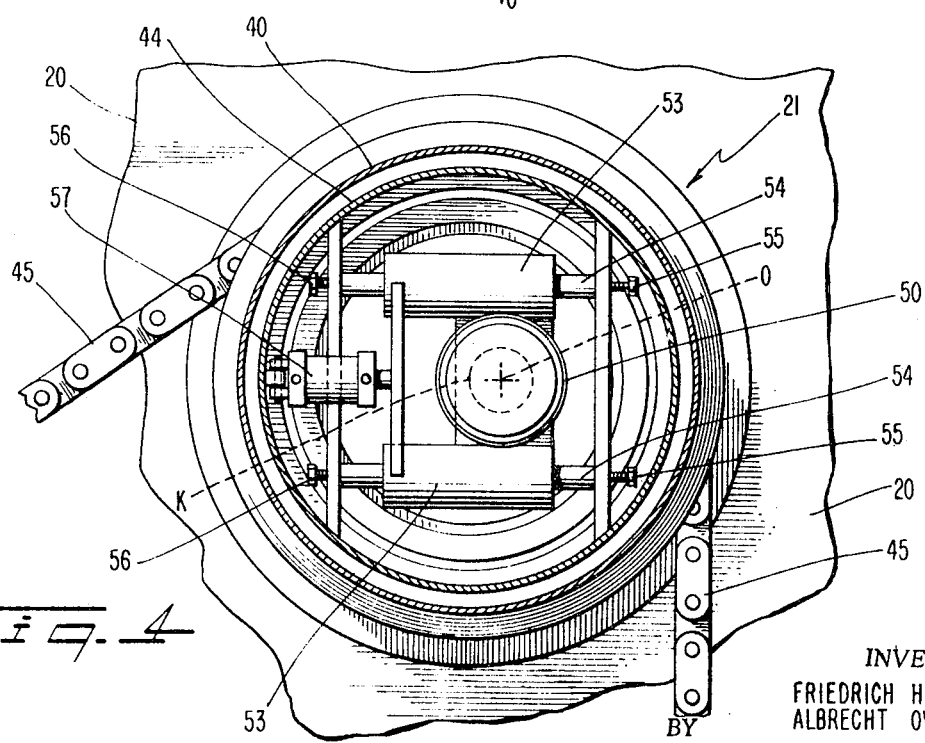
FIG. 4 is a view in plan of the tool support.

The construction and manner of operation of each of the grinding mechanisms 21 will be understood upon consideration of FIGS. 3 and 4. The grinding mechanism has an outer housing 40 which is fixedly attached at its base 41 to the platen 20. Within housing 40 there is mounted an inner housing 44 which is mounted for rotation about its vertical axis upon ball bearings 42 and 43. Although the outer housing 40 moves only in a plane during the course of the grinding operation, the inner housing 44, which supports the grinding wheel 10, may be turned through 360° during the course of a grinding operation for a purpose to be described below. The grinding wheel 10 is driven by a motor 50 which is mounted on the prolongation of the arbor 51 which carries the grinding wheel. The axis 0–0 of the arbor 51 and the grinding wheel 10 lies offset from the axis of the housings 40 and 44, as shown in FIG. 3. The grinding wheel 10 and its driving and supporting means 50, 51 are mounted upon the inner housing 44 through the medium of guides 53 which slide along respective rods 54 affixed to housing 44. The extent of movement of the slides 53 is limited by adjustable abutment screws 55, 56. The screw 56 is adjusted so that the point K at which the grinding wheel 10 engages the glass lies exactly upon the axis of the housings 40 and 44.

When the grinding wheel 10 becomes of smaller diameter through use, adjustment of the screw 56 restores the periphery of the grinding wheel to point K. The movement of the grinding wheel in the direction of the arrow f serves to move the grinding wheel into its final position with respect to the edge of the glass determined by abutment screw 56. The grinding mechanism does not begin to operate until the grinding tool has attained its working position. In order to move the slides 53, there is provided a double-acting cylinder 57 which is controlled by a means 58. Control means 58 receives impulses from a central control system (not shown) which controls the movements, and the synchronization thereof, of all the operative phases of the apparatus.

The mechanism described above places the grinding wheel 10 in the desired position through the medium of the cylinder 57 and the abutment screw 56 which, when adjusted, remains rigidly in its adjusted position. In an alternative construction, equally advantageous over the prior art, the abutment 56 may be made yieldable, so that, with a small permanently applied pressure in cylinder 57 thrusting the grinding tool toward the glass, the grinding tool will be elastically held in position and will follow the predetermined contour of the glass while engaging it with a small constant pressure. Thus the travel of the grinding wheel is controlled in an overall manner by the template, and the grinding wheel is always moved in a direction perpendicular to the edge of the glass; because of its elastic mounting the force of engagement of the grinding wheel with the glass is not changed by the wearing of the grinding wheel.

Figure 5:
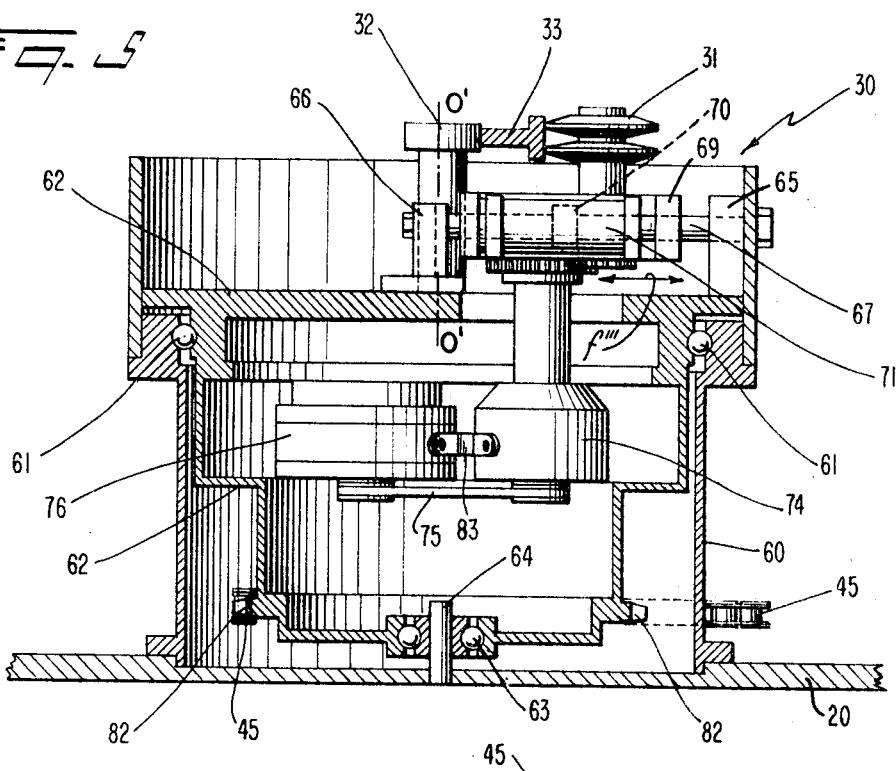
FIG. 5 is a view in vertical section through the template follower.
Figure 6:
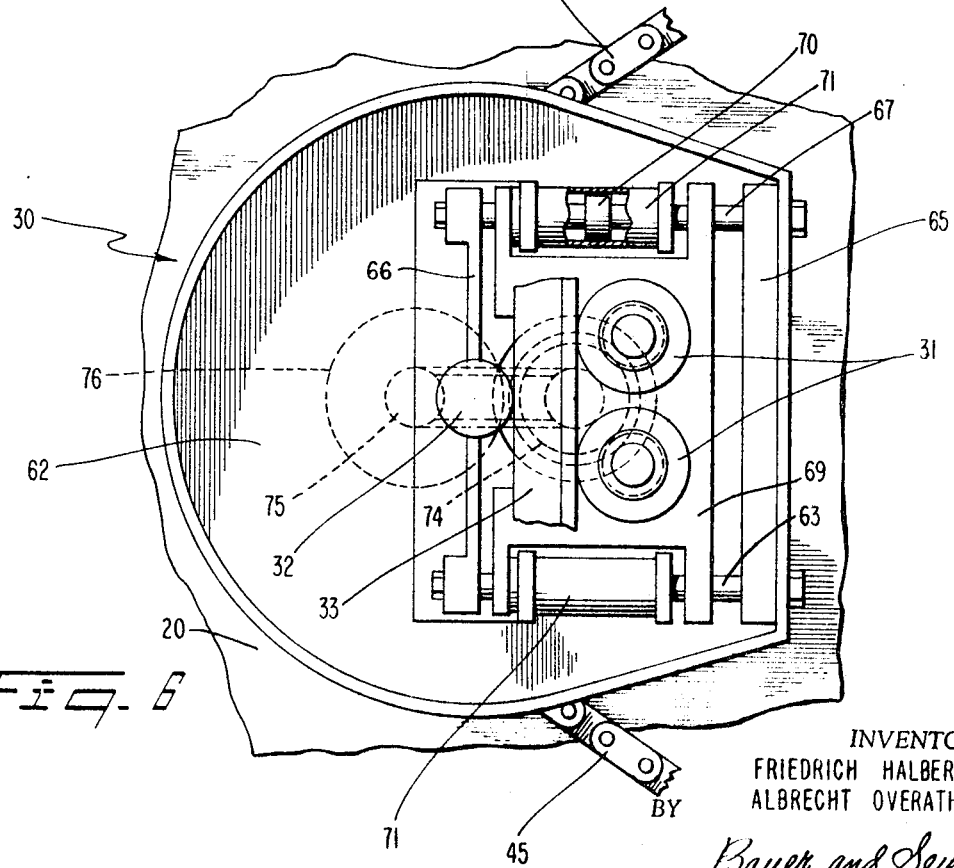
FIG. 6 is a view in plan of the template follower.

The details of construction of the template follower are shown in FIGS. 5 and 6. The template follower has a fixed outer housing 60 affixed to the platen 20, the housing 60 having at its upper end a ball bearing 61 upon which an interior housing 62 rotates on a vertical axis. At its lower end the inner housing is mounted upon a ball bearing 63 the fixed race of which is secured to platen 20 by a pin 64. The interior housing at its upper part carries two spaced uprights 65 and 66 to which are fastened two parallel guide rods 67 and 68 upon which a platen 69 (FIG. 6) slides in the direction of the arrow $f''$ shown upon FIG. 5. The guide rods 67 and 68 carry fixed pistons 70 disposed intermediate their length, such pistons fitting within parallel cylinders 71 which slide upon the pistons and piston rods. The cylinders 71 are affixed to platen 69, and so when the opposite ends of the cylinders are selectively subjected to fluid under pressure the platen 69 is displaced in a respective one of two opposite directions.

A template follower rollers 31, which are mounted in side-by-side relationship on the upper surface of platen 69, are driven by an electric motor 76 through gearing 75, 74, the motor and gearing being affixed to the lower part of platen 69 by means including bracket 83, FIG. 5. The platen 69, the rollers 31, the motor 76, and the gearing 75, 74 are freely movable within housing 62 in the direction of the arrow $f'''$ that is, parallel with guide rods 67, 68. The rollers 31, which engage the outer surface of the template, are made of tough, fairly hard rubber to assure that they grip the template 33. The axis $0^1$ of the guide roller 32, which follows the inner surface of the template 33, coincides with the axis of the inner housing 62 of the template follower 30.

As above mentioned, the inner housing 44 of the grinding mechanism 21 is rotatable about the central vertical axis of the housing 40; such axis may be taken to be the main or central axis of the mechanism 21. Reverse rotation of the housing 44 adjusts the axis of the grinding wheel 10 toward and away from the central axis of mechanism 21. Such adjustment of the grinding tool, in order that it will cut the edge of the glass to the desired contour, is automatically effected as follows. The inner housing 62 of the template follower 30 has a sprocket 82 adjacent its lower end. The inner housing 44 of each of the grinding mechanisms 21 has a sprocket 46 adjacent its lower end. A chain 45 is entrained about the sprocket 82 and the two sprockets 46 as shown in FIGS. 2 and 7. As the template following rolls 31, 32 travel around the rounded corners of the template 33 the housing 62 is turned; the sprockets 82, 46 and the chain 45 turn the inner housings 44 and thus the grinding wheels about the main vertical axes of the respective grinding mechanisms.

Although two grinding mechanisms are shown controlled by a single template follower, it will be understood that, if desired, a single grinding mechanism, or three or more such grinding mechanisms may be controlled in the same manner by a single template follower.

In accordance with a nonillustrated embodiment of the invention, the template follower mechanism 21 may be omitted from support 20, and the body 22, 23, 24 may be driven by a computer or memory system through appropriate driving mechanisms. For such control there may be employed known mechanisms such as punched tapes or magnetic bands. Such a computer control is advantageous when only a small number of glass plates of a given contour are to be edge ground, since the replacement of one program by another may be accomplished very rapidly. With such computer control the plates of glass will be centered before they are ground, as in the embodiment herein specifically described and illustrated.

What is claimed is:

1. Apparatus for grinding the edge of a sheet of glass along a predetermined contour, comprising, a support operable to locate in a first fixed plane, a sheet of glass to be ground, a frame, mounting means carried by said frame to fixedly mount a template over said support, parallel with and spaced from said plane, first rectilinear guide means fixedly mounted intermediate said template on said frame and said support, parallel with said plane, second rectilinear guide means parallel with said first plane and normal to and carried by said first rectilinear guide means, a platen integrally connected with and guided by said second rectilinear guide means, for universal movement in a second plane offset from and parallel with said first plane, follower means carried by said platen and engaging said template fixedly carried by said mounting means, and first bearing means journaling a grinding wheel on said platen, for rotation in said first plane and on an axis essentially normal thereto, for engagement with a sheet of glass mounted on said support.

2. Apparatus according to claim 1, said template fixed on said mounting means and said follower means, being disposed on one side of said platen and said grinding wheel carried by said platen being disposed on the other side of said platen for engagement with a sheet of glass on said support.

3. The apparatus of claim 1, said follower means and said bearing means, being mounted on said platen in laterally offset relation, means rotatably mounting said follower means and said bearing means, on said platen, each for 360° rotation about parallel axes normal to said first plane, and means connecting said follower means and said bearing means, for synchronous rotation each about its axis.

4. The apparatus of claim 1, said template is of a predetermined contour mounted on said support, said follower means and said bearing means being each rotatable on and with respect to said platen about respective, laterally offset parallel axes normal to said first plane, and means connecting said follower means and said bearing means for rotation in synchronism each about its respective axis.

5. The apparatus of claim 4, a second bearing means on said platen, journaling a second grinding wheel on an axis normal to said first plane, and offset from the axes of said follower means and said first bearing means, and means connecting said follower means and said first and second bearing means for rotation in synchronism each about its respective axis normal to said first plane, with respect to said platen.

6. Apparatus according to claim 1, said support comprising a turntable journaled for rotation about a central axis normal to said first plane, a plurality of glass sheet mounts each fixedly secured to said turntable in angularly spaced relation about said central axis, means rotating said turntable step by step to sequentially index each said mount to a glass loading station, a glass grinding station, and a glass discharging station, each said mount comprising means operable at said grinding station, to grip a sheet to be ground and to translate the same parallel with said central axis, into said first plane for grinding by said wheel.

7. The apparatus of claim 6, each said mount including a plate, and retractible upstanding members on said plate, releasably engaging the edges of a sheet at said grinding station to center it, vacuum cup means affixed to said plate and engaging the sheet thereon at said grinding station, said vacuum cup means being rendered effective and said members being released from the sheet, as the sheet is translated into said first plane.

8. The apparatus of claim 1, said first rectilinear guide means comprising a pair of parallel first rails spaced in a pane parallel to said first plane, said second rectilinear guide means comprising a pair of tubes each slidably mounted on a respective one of said first rods, for guided translation therealong, a second pair of parallel rails normal to said first pair of rails and rigidly interconnecting said tubes, and means slidably mounting said platen on said second pair of rails for guided translation therealong.

9. The apparatus of claim 8, said first bearing means including a housing rotatable about said first axis, a guide, means mounting said guide on said housing for translation in a direction radially of said first axis, a motor-grinding wheel unit carried by said guide for rotation on a second axis parallel to said first axis and radially offset therefrom, and power means connected with said guide to translate the same and thus vary the radial distance between said axes.

10. The apparatus of claim 4, said template having inner and outer parallel guide surfaces, said follower means including first and second guide rollers spaced along and engaging said outer template surface, and a third guide roller having its axis in a median plane between the axes of said first and second rollers and parallel therewith, said bearing means comprising a housing journaled on said platen for rotation on an axis normal thereto, a guide, a grinding wheel arbor journaled on said guide for rotation on an axis normal to said platen, means mounting said guide and arbor for translation on and with respect to said housing, to vary the distance of separation of the axes of said housing and said spindle, the means last-named, being connected to said housing to rotate the same and maintain parallel with said median plane, a line parallel with said platen, through the axes of said housing and said spindle.

* * * * *